(12) United States Patent
Liau

(10) Patent No.: US 12,392,329 B1
(45) Date of Patent: Aug. 19, 2025

(54) POWER GENERATION MECHANISM APPLYING SOLAR HEAT TOGETHER WITH GEOTHERMAL HEAT

(71) Applicant: George Uh-Schu Liau, Markham (CA)

(72) Inventor: George Uh-Schu Liau, Markham (CA)

( * ) Notice: Subject to any disclaimer, the term of this patent is extended or adjusted under 35 U.S.C. 154(b) by 0 days.

(21) Appl. No.: 19/036,434

(22) Filed: Jan. 24, 2025

(51) Int. Cl.
| | |
|---|---|
| *F03G 6/00* | (2006.01) |
| *F01K 11/02* | (2006.01) |
| *F03G 4/00* | (2006.01) |
| *F24S 70/00* | (2018.01) |
| *H02K 7/18* | (2006.01) |
| *H02S 10/10* | (2014.01) |
| *H02S 40/44* | (2014.01) |

(52) U.S. Cl.
CPC ............ *F03G 6/0055* (2021.08); *F01K 11/02* (2013.01); *F03G 4/037* (2021.08); *F24S 70/00* (2018.05); *H02K 7/1823* (2013.01); *H02S 10/10* (2014.12); *H02S 40/44* (2014.12)

(58) Field of Classification Search
CPC ........ F03G 6/0055; F03G 4/037; F01K 11/02; F24S 70/00; H02K 7/1823; H02S 10/10; H02S 40/44
See application file for complete search history.

(56) References Cited

U.S. PATENT DOCUMENTS

| | | | |
|---|---|---|---|
| 10,829,913 B1 * | 11/2020 | Ahmed ................ | B01D 61/025 |
| 2010/0031653 A1 * | 2/2010 | Foppe .................... | E21B 43/24 |
| | | | 166/308.1 |

\* cited by examiner

*Primary Examiner* — Joseph Ortega
(74) *Attorney, Agent, or Firm* — BACON & THOMAS, PLLC

(57) ABSTRACT

A power generation mechanism that utilizes solar heat together with geothermal heat is equipped with a boiler and at least one pipeline generator unit. The lower end of the boiler is provided with an input pipe, which can extend deep into the ground to extract dry geothermal heat accumulated in the subterranean layer into the interior of the boiler. The upper end of the boiler is equipped with a solar heat collector, which transfers solar heat to the interior of the boiler to further heat hot water inside; in addition, the upper end of the boiler is connected to at least one output pipe, which can transport the heated water and steam to a pipeline generator unit. By directing hot water and steam through a power generation channel located between the upper water tank and the lower water tank of the pipeline generator unit, the generator unit in the power generation channel generates electricity.

9 Claims, 4 Drawing Sheets

POWER GENERATION MECHANISM APPLYING SOLAR HEAT TOGETHER WITH GEOTHERMAL HEAT

BACKGROUND OF THE INVENTION

Field of the Invention

The present invention relates to a power generation mechanism, specifically to a mechanism that utilizes dry geothermal heat, solar heat and water in energy co-function. The hot water and steam is circulated to generate electricity continuously to enhance the effect of energy function in comparison with conventional steam power generation systems.

Description of the Related Art

Currently, the common methods of power generation include mainly hydroelectric power, thermal power, and nuclear power. Where in, hydroelectric power generates electricity through water level differences, but it requires high-altitude water sources and is heavily constrained by local environmental conditions; the thermal power generation relies on fuels such as coal, oil, and natural gas, which not only incur high costs but also cause significant environmental damage; while nuclear power is more economical, it poses greater risks to the planet; and unpredictable factors such as human error or earthquakes can lead to catastrophic and irreparable consequences.

As early as the Industrial Revolution, it was known that steam could be used to drive mechanical equipment. Taking Taiwan, Japan, and the Philippines as examples, these regions are located along the Pacific Ring of Fire and host numerous active volcanoes. Although most areas have entered a dormant volcanic phase, the abundance of hot springs indicates that geothermal heat remains plentiful underground. If this resource can be harnessed for power generation, it would not only address energy shortages in these countries but also foster the development of the power generation industry.

The power system and the photosynthesis system are two basic systems of energy co-function. These two systems work in harmony to sustain life in the universe.

The energy co-function in photosynthesis is expressed as M1 ($CO_2$) C×M2 ($H_2O$) C, wherein C represents light. The energy co-function in the power system of the present invention is expressed as water×geothermal heat×solar heat. If a power generation system is not limited to single-use generation, the collective action of all power-generating components can produce significantly more electricity than electricity consumed for pumping. It is similar to how the human heart functions as a pump, utilizing only a relatively small portion of energy to generate power and keep human beings alive. Power generation is an energy effect, it can be enhanced through an energy co-function system, like that of the human body. For instance, blood circulation, driven by the heart pump, transports nutrients and oxygen, and the various functions of organs in a closed system work together to generate energy for the human body.

The ecosystem in which humans live is essentially an energy co-function system. Without the co-function of energy, nothing can grow or sustain itself. One stage energy effect may be another stage energy source to produce a further energy effect by energy co-function, such as photosynthesis to produce glucose and oxygen. The ecosystem is sustained because the co-function of energy amplifies energy effects.

Considering that many countries with abundant geothermal heat primarily use them for hot springs, which is quite a waste. The inventor has been actively conducting research for many years, and after extensive research and review, several inventions have already been filed with Taiwan IP Office as follows: Multilayer Boxed Solar Heat Energy Cell (filed on Dec. 14, 2016), Device for Generating Electricity Using Light Energy (filed on Apr. 3, 2018), and Adjustable Solar Light Simulator (filed on Mar. 13, 2020). However, the technologies in these cases were not yet fully refined. The inventor then continued to study and improve upon them, ultimately leading to the creation of this invention, the Power Generation Mechanism Applying Solar Heat Together with Geothermal Heat.

SUMMARY OF THE INVENTION

Therefore, this invention is objected to provide a power generation mechanism that utilizes solar heat combined with dry geothermal heat for electricity generation.

According to the power generation mechanism of this invention, dry geothermal heat and solar heat are utilized as energy sources. And by the action of solar heat and geothermal heat water is boiled to generate hot water and steam to drive multiple power generation units within a plurality of conduits for cyclic electricity generation. Hot water and steam cyclically pass flow through power generation channels, prompting the generator units within the channels to produce electricity, this is a secondary object of the invention.

According to the power generation mechanism of this invention, the boiled hot water and steam circulate within a closed system. The only energy cost is the electricity consumption of the pump, thereby achieving a significantly high power generation efficiency. This is another object of the invention.

According to the power generation mechanism of this invention, solar heat collected by a solar thermal collector is used as a sustainable thermal energy source for the closed system. The closed system can feature multiple power generation channels (e.g., 32 channels, each equipped with 10 power generator units). Since energy conversion is not one-to-one and hot water and steam expansion power is not limited to a single use, only a fraction of thermal energy in terms of power is lost during conversion and is recouped in the boiler in each cycle of circulation, the system's operation is thus maintained. This is yet another object of the invention.

According to the power generation mechanism of this invention, dry geothermal heat and solar heat are utilized. By means of a pump, hot water containing steam is circulated through multiple power generation sections within a closed system, thereby generating electricity. This process is analogous to an overall energy effect being enhanced through an energy synergistic function system (such as the human body effectively and continuously producing energy). This constitutes yet a further object of the invention.

In order to facilitate the people to have a further understanding and understanding of the purpose, shape, features and effects of the structure of the present invention, the following examples are provided in conjunction with the drawings, and the structure of the present invention is described in detail as follows:

DETAILED DESCRIPTION OF PREFERRED EMBODIMENT

Figure 1:
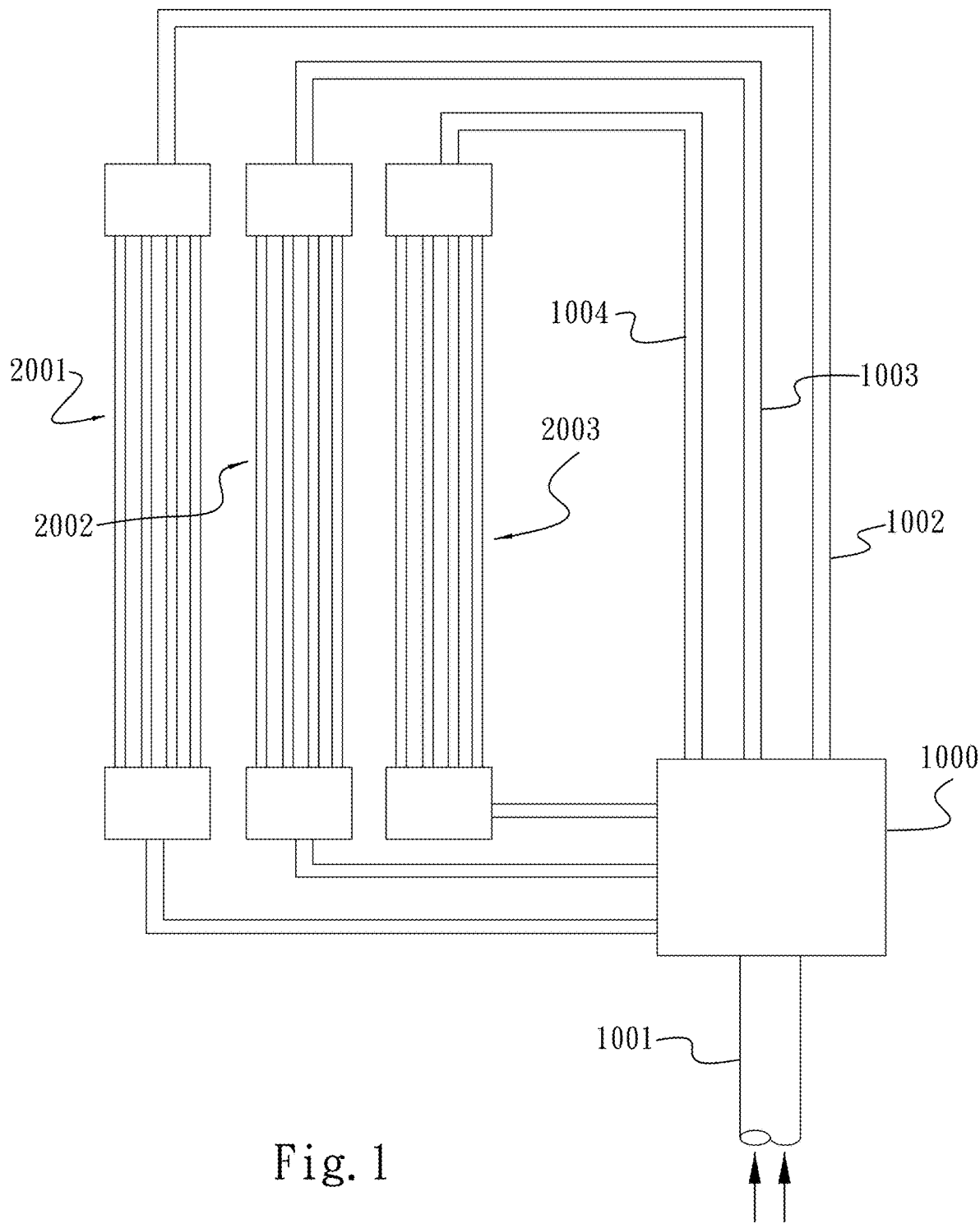
FIG. 1 is a schematic top view of the power generation mechanism applying solar heat together with geothermal heat of the present invention.

As shown in FIG. 1, the power generation mechanism applying solar heat together with geothermal heat of the present invention mainly comprises a boiler (1000) and multiple pipeline generator units (2001, 2002, 2003). The bottom of the boiler (1000) is equipped with an conveyor pipe (1001) that extends deep underground to extract dry geothermal heat into the boiler (1000). The upper end of the boiler (1000) is connected to multiple output pipes (1002, 1003, 1004), which are linked to the pipeline generator units (2001, 2002, 2003), facilitating the transfer of hot water and steam from the boiler (1000) to the generator units.

Figure 2:
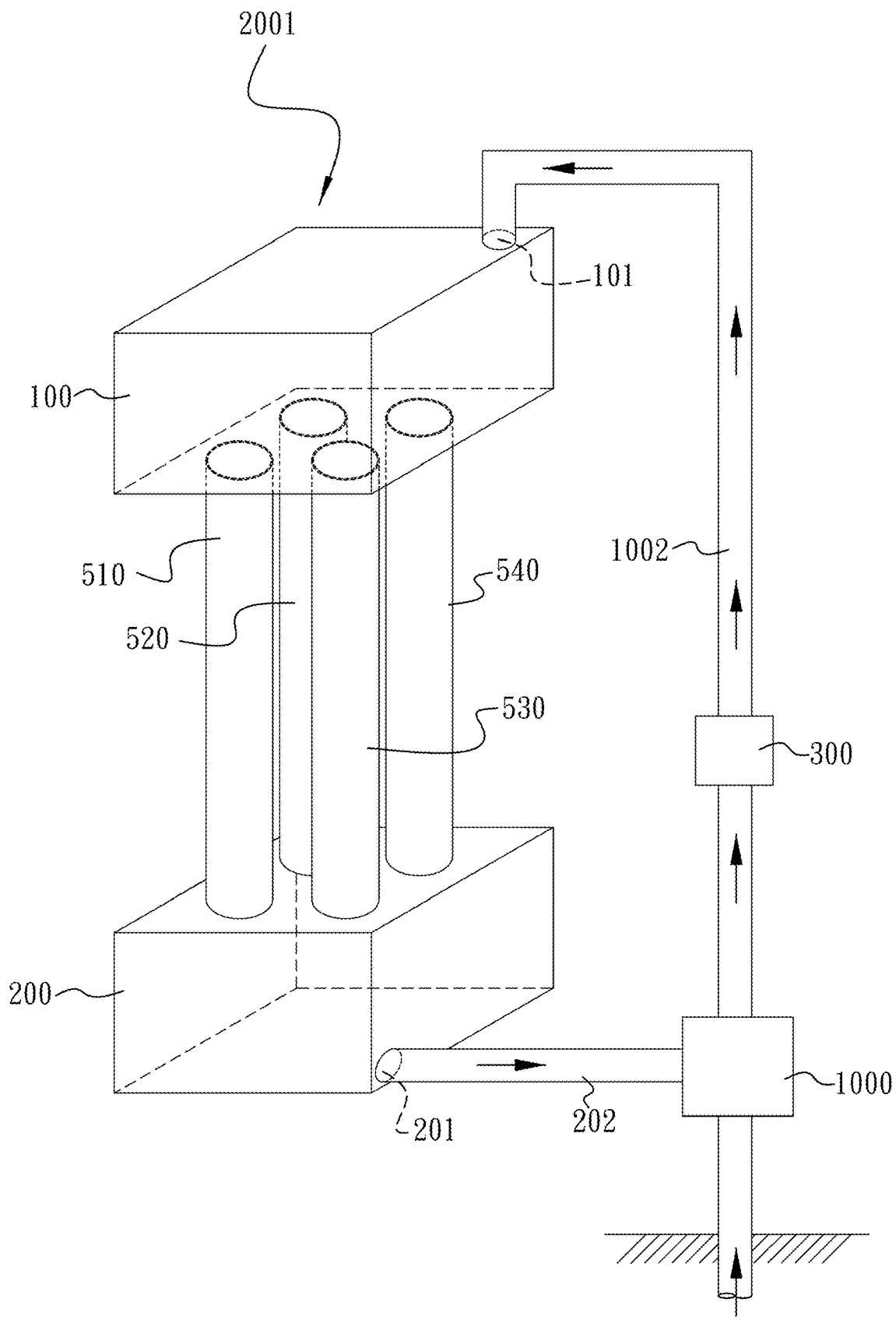
FIG. 2 is a partial three-dimensional schematic view of the power generation mechanism applying solar heat together with geothermal heat of the present invention.

Please refer to FIG. 2, the structure of each pipeline generator units (2001, 2002, 2003) is identical, with pipeline generator unit (2001) described as an example. The unit consists of an upper water tank (100) and a lower water tank (200), connected by multiple power generation channels (510, 520, 530, 540), for example, 20 or more. The upper water tank (100) has an inlet (101) connected to output pipe (1002). A pump (300) is positioned along the output pipe (1002) to rapidly conduct hot water and steam from the boiler (1000) into the upper water tank (100). The hot water and steam flows from the upper water tank (100) through the power generation channels (510, 520, 530, 540) into the lower water tank (200). An outlet (201) is located on one side of the lower water tank (200), connected to a discharge pipeline (202), which loops back to the boiler (1000). This configuration establishes a closed circulation system for hot water and steam flow.

Figure 3:
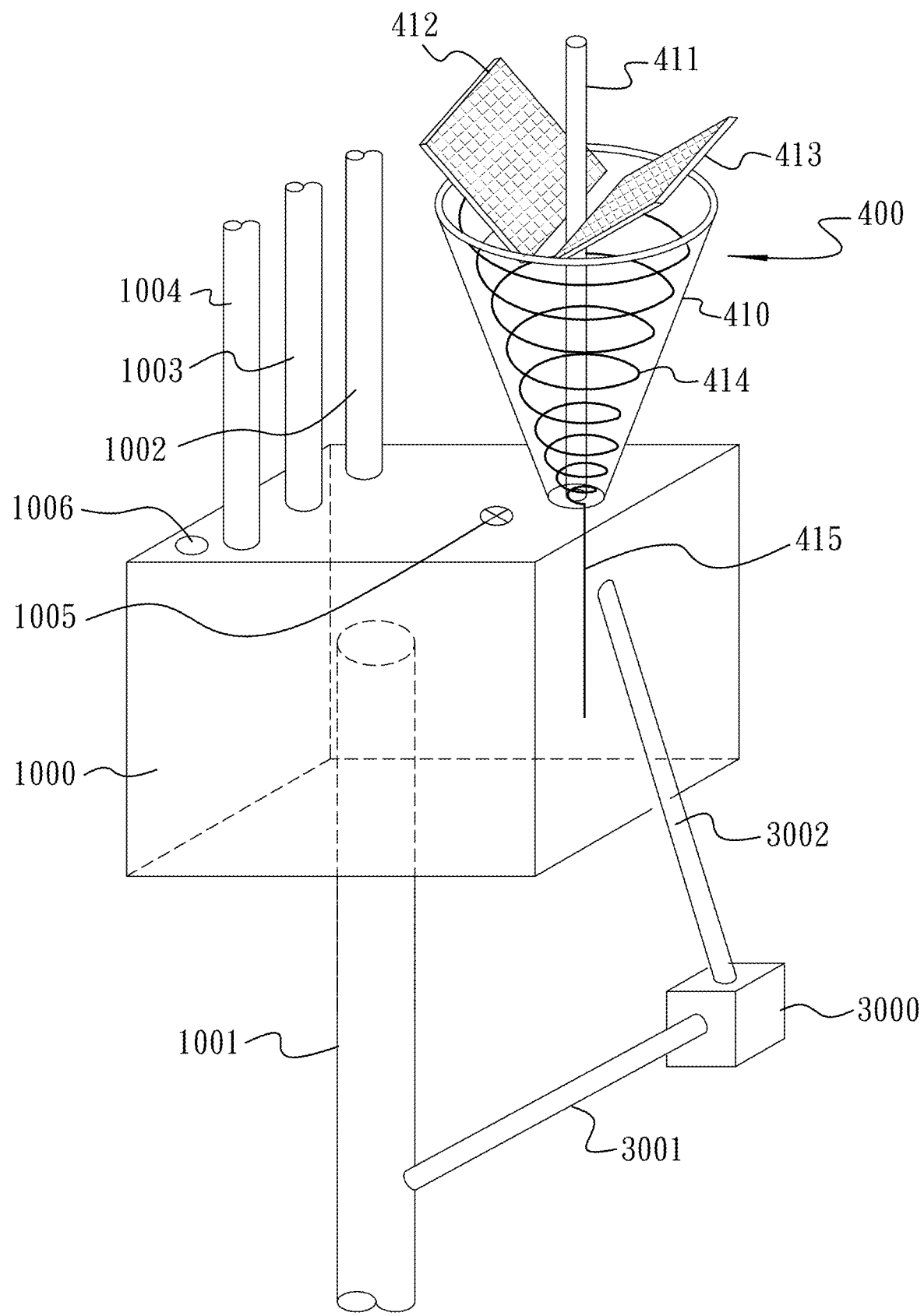
FIG. 3 is another partial three-dimensional schematic view of the power generation mechanism applying solar heat together with geothermal heat of the present invention.

Please refer to FIG. 3, the upper end of the boiler (1000) is further equipped with a solar heat collector (400). The solar heat collector (400) is installed with a plurality of tilted solar heat chip panels (411, 412) on the upper end of a conical enclosure (410). A metallic conduit (413) stands vertically at the center of these panels. The solar heat chip panels (411, 412) reflect sunlight onto the surface of the metallic conduit (413), causing it to heat up. The thermal energy generated by the solar heat chip panels (411, 412) is transferred to a spiral metal coil (414) located below, heating it up as well. The solar heat chip panels have solar cells on metal panels, while metal panels transfer heat, solar cells generate electricity for the pump to stand activate operation of the whole power generation system. The bottom of the spiral metal coil (414) is connected to the lower end of the metallic conduit (413), which in turn connects to a metallic wire (415) that extends into the boiler (1000). This configuration allows the solar heat collector (400) to transfer solar thermal energy through the metallic wire (415) to reheat hot water boiled by the geothermal heat in the boiler (1000) and to generate steam. The reheated hot water and steam flow through the output pipes (1002, 1003, 1004) into the upper water tank (100) of the pipeline generator units (2001, 2002, 2003). Additionally, the boiler (1000) is equipped with a pressure release valve (1005) and water filling port (1006) to promptly release any excessive pressure inside the boiler and add water on time.

As shown in the above figures, a vacuum generator (3000) is installed below the boiler (1000). The vacuum generator (3000) is equipped with a first conduit (3001) at one end and a second conduit (3002) at the other. The first conduit (3001) is connected to the conveyor pipe (1001), and the second conduit (3002) is connected to the inside of the boiler (1000). Thus, through the operation of the vacuum generator (3000), dry geothermal heat collected from the underground, can be quickly drawn into the first conduit (3001) and transported through the second conduit (3002) to the interior of the boiler (1000).

Figure 4:
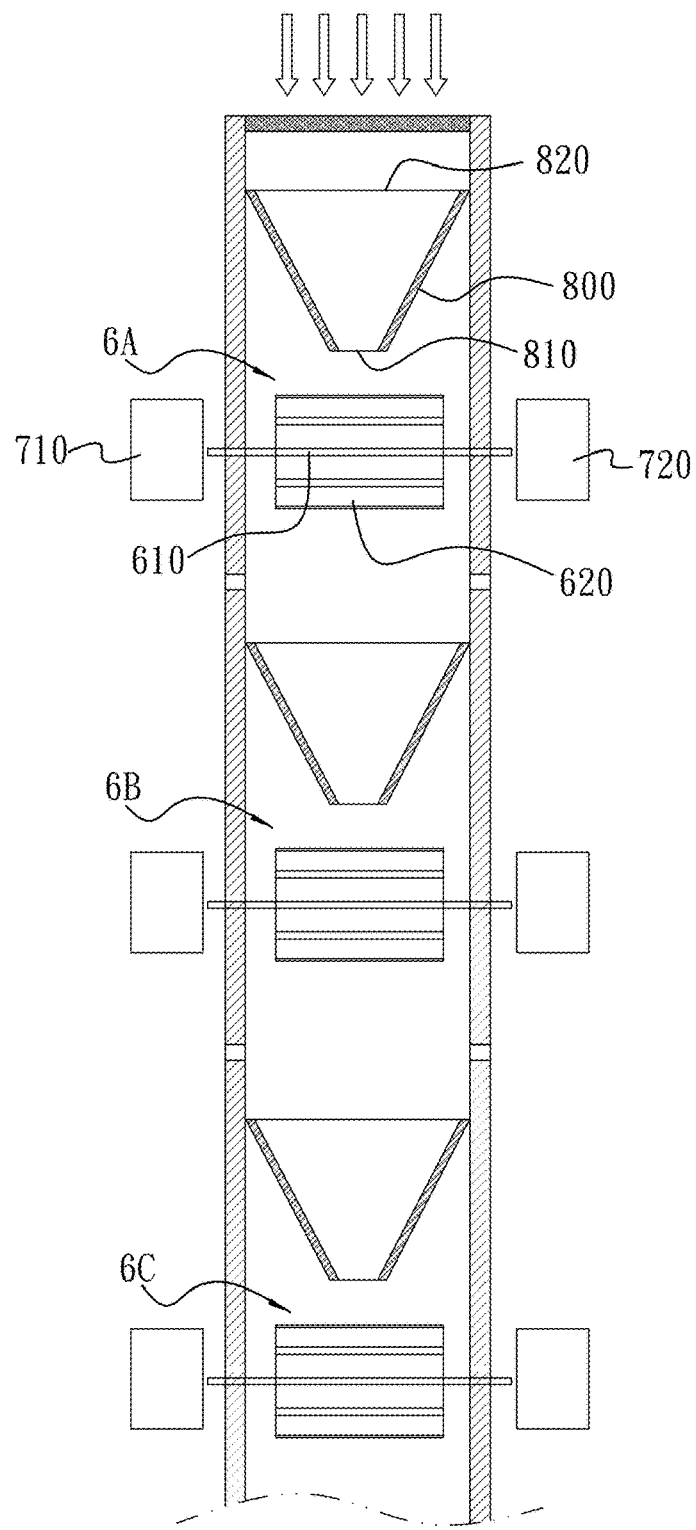
FIG. 4 is a schematic illustration of the arrangement of some generator units within the power generation channel of the power generation mechanism of the present invention.

Please refer to FIG. 4, the power generation channels (510, 520, 530, 540) positioned between the upper water tank (100) and the lower water tank (200) contain multiple sets (for example, sets or more) of generator units (6A, 6B, 6C, etc.) spaced apart inside the pipes. Each generator unit (6A, 6B, 6C, etc.) utilizes a dual-end rotor shaft (610) that passes through the pipe wall of the power generation channels (510, 520, 530, 540) and is fixed inside the channels. The dual-end rotor shaft (610) extends through the pipe wall of the power generation channels (510, 520, 530, 540), with each end connected to a generator (710, 720). The dual-end rotor shaft (610) inside the channels is equipped with turbine fan blades (620). As the hot water and steam flow downward, the fan blades (620) are driven to rotate, which in turn drives the dual-end rotor shaft (610) to rotate, driving the generators (710, 720) to generate electricity.

As shown in the above figures, the interior of each power generation channel (510, 520, 530, 540) is equipped with a funnel (800) at the top of each generator unit (6A, 6B, 6C, etc.). The funnel (800) is preferably welded to the inner pipe wall of the power generation channels (510, 520, 530, 540). The lower end of the funnel has a small opening (810), while the upper end has a large opening (820). The small opening (810) faces the turbine fan blades (620) on the dual-end rotor shaft (610). Therefore, when hot water and steam flow downward through the funnel (800), they flow from the large opening (820) to the small opening (810), creating high pressure that pushes against the turbine fan blades (620), accelerating their rotation and improving the power generation efficiency of the generators (710, 720).

Thus, by the assistance of the vacuum generator (3000), the power generation mechanism applying solar heat together with dry geothermal heat of the invention, enables geothermal heat collected from the underground, to be quickly absorbed into the boiler (1000), together with the dry geothermal heat being absorbed through the conveyor pipe into the boiler (1000), hot water after being reheated by the solar heat collector (400), not only increases in temperature but also generates hot steam. The generated hot water and steam are then activated by pump (300) and transported through output pipes (1002, 1003, 1004) into the upper water tanks (100) of the pipeline generator units (2001, 2002, 2003). The hot water and steam entering the upper water tank (100) flow downward through the power generation channels (510, 520, 530, 540), and pass through the funnel (800). While hot water and steam flows from the large opening (820) to the small opening (810), the geothermal heat and steam expansion force is increased, which accelerates the turbine fan blades (620) on the dual-end rotor shaft (610), thereby generating electricity through the generators (710, 720) installed at both ends of the shaft.

In summary, the "Power Generation Mechanism Applying Solar Heat Together with Geothermal Heat" of this invention indeed provide features of unprecedented and innovative structure. It has not been disclosed in any publication, nor has any similar power generation system been observed in the market. Therefore, its novelty should be indisputable. Furthermore, the unique characteristics and functionalities of this invention far surpass those of conventional systems, demonstrating its significant advancement and compliance with the requirements for filing an invention patent under the relevant patent law of your esteemed country. This application is therefore submitted in accordance with the law. The configurations described in this specification pertain solely to the layout of the power generation mechanism using solar and geothermal heat. The detailed structural elements necessary for the operation of this system do not affect the patentability of this invention and are duly disclosed.

It is to be noted that the above is a preferred embodiment of the present invention, and if it is changed according to the concept of the present invention, the function of the present invention which does not exceed the spirit of the specification shall be deemed to be in the scope of present invention.

What is claimed is:

1. A power generation mechanism applying a solar heat together with a geothermal heat, comprising a boiler and at least one pipeline generator unit;
    the bottom of the boiler is provided with a conveyor pipe capable of extending into the underground to draw dry the geothermal heat, being collected from the underground into the boiler;
    the top of the boiler is provided with at least one output pipe, the other end of the at least one pipe connected to the at least one pipeline generator unit, allowing the generated hot water and steam within the boiler to be delivered to the at least one pipeline generator unit.

2. The power generation mechanism applying the solar heat together with the geothermal heat as claimed in claim 1,
    wherein the top of the boiler is additionally equipped with a solar heat collector, which comprises multiple inclined solar heat chip panels arranged at the top of an outer casing, with a central metal conduit positioned upright among the multiple inclined solar heat chip panels, reflecting sunlight onto the surface of the metal conduit, causing heat up.

3. The power generation mechanism applying the solar heat together with the geothermal heat as claimed in claim 2,
    wherein the lower ends of the multiple solar heat chip panels are connected to a helical metal coil to transfer the thermal energy generated by sunlight to the coil;
    wherein the lower end of the helical metal coil is connected to the lower end of the metal conduit, connected to a metal wire extending into the boiler, thereby utilizing the metal wire, to reheat the fluid inside the boiler.

4. The power generation mechanism applying the solar heat together with the geothermal heat as claimed in claim 2,
    wherein the top of the boiler is further provided with a pressure relief valve to release the internal pressure of the boiler as needed.

5. The power generation mechanism applying the solar heat together with the geothermal heat as claimed in claim 2,
    wherein a vacuum generator is located below the boiler, and one end of the vacuum generator is connected to a first conduit first end, while the other end of the vacuum generator is connected to a second conduit;
    the other end of the first conduit is connected to the conveyor pipe, and the other end of the second conduit is connected to the interior of the boiler, with the assistance of the vacuum generator, dry geothermal heat collected underground can be rapidly drawn through the first conduit and delivered into the boiler via the second conduit.

6. The power generation mechanism applying the solar heat together with geothermal heat as claimed in claim 1,
    wherein said at least one pipeline generator unit comprises an upper water tank and a lower water tank, with multiple power generation channels arranged in between;
    wherein the upper water tank is provided with an inlet at the top, connected to the output pipe;
    wherein a pump is installed in the middle section of the output pipe to direct the hot water and steam inside the boiler into the upper water tank;
    wherein the hot water and the steam that enters the upper water tank flows downward through the power generation channels into the lower water tank;
    wherein one side of the lower water tank is equipped with an outlet connected to a discharge pipeline, which communicates with the boiler, thus forming a closed circulating system.

7. The power generation mechanism applying the solar heat together with the geothermal heat as claimed in claim 1,
    wherein said at least one generator units are arranged at intervals inside the power generation channels of the pipeline generator unit;
    each at least one generator unit uses a dual-end rotor shaft with the two ends extending through the walls of the power generation channel to be fixed inside the channel, and
    wherein the at least one generator unit two ends of the dual-end rotor shaft extends through the channel walls connected to a generator.

8. The power generation mechanism applying the solar heat together with the geothermal heat as claimed in claim 7, wherein said dual-end rotor shaft installed inside the power generation channel is equipped with turbine blades, the turbine blades can be driven to rotate by the downward flow of hot water and steam, thereby causing the rotor shaft to rotate and drive the generator to generate electricity.

9. The power generation mechanism applying the solar heat together with the geothermal heat as claimed in claim 8,
    wherein each generator unit within the power generation channels is provided with a funnel above;
    wherein the funnel's lower end is a small opening directed toward the turbine blades of the dual-end rotor shaft, while the upper end is a large opening, enabling the hot water and steam to flow from the large opening to the small opening, concentrating pressure on the turbine blades to enhance their rotational speed.

* * * * *